United States Patent Office 3,320,737
Patented May 23, 1967

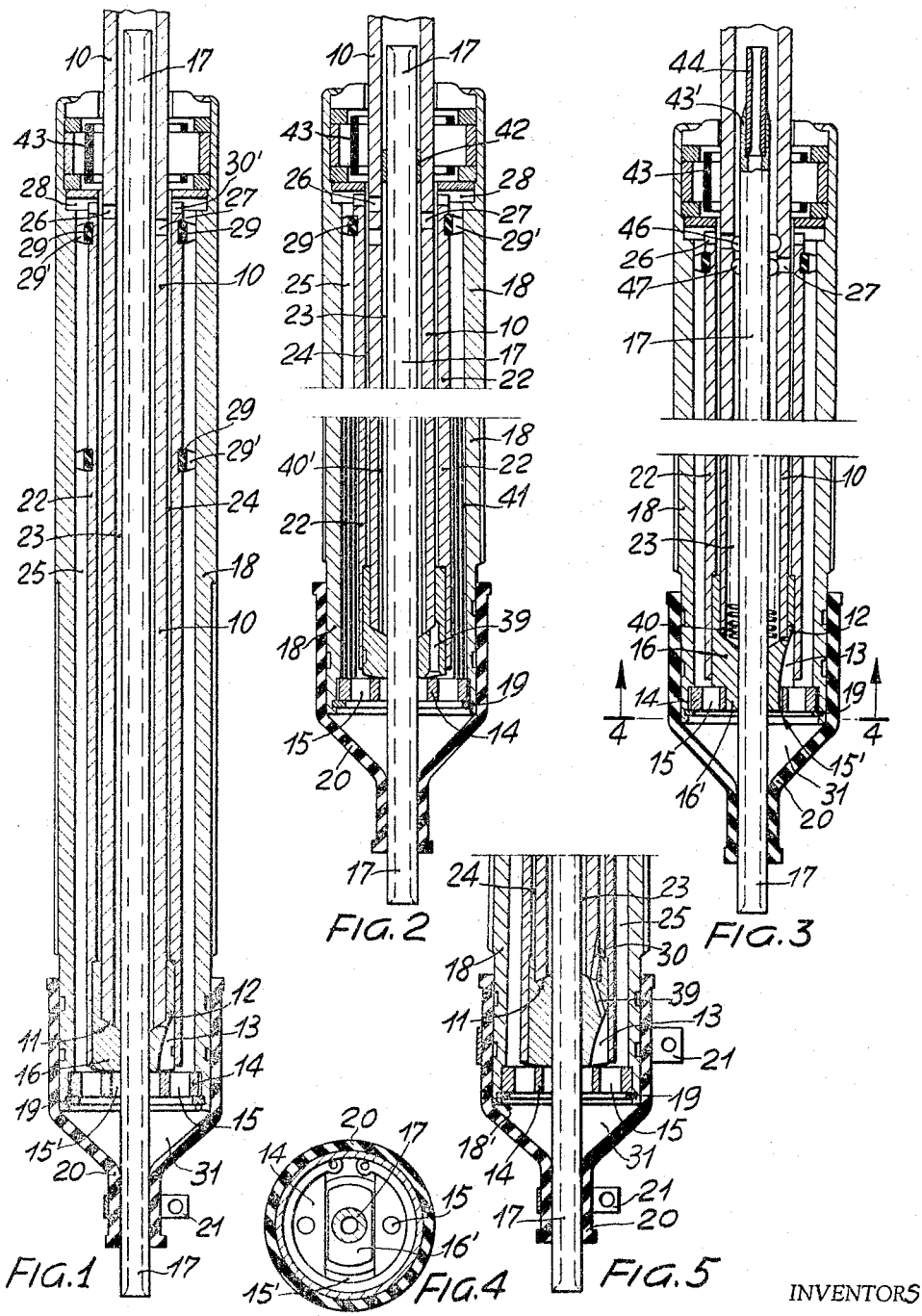

3,320,737
ANTIVIBRATING SPINDLE FOR SPINNING AND TWISTING
Andrea Ferrario and Luigi Ferrario, both of Via Dante Alighieri 19, Mandello Lario, Italy
Filed Sept. 15, 1964, Ser. No. 396,646
7 Claims. (Cl. 57—129)

The present invention relates to spinning and twisting spindles, and particularly to such a spindle in which the vibration is kept to a minimum.

It is well known that, for particular twisting operations as, for instance, for the twisting after binding two different types of thread, it is desirable to obtain rapidly rotating spindles, bored along their axis in order for the passage of the thread therethrough, and spindles which are able to carry a great quantity of thread upon the cop rotating together with the spindle.

Heretofore such longitudinally bored spindles had the disadvantage of low speed and of limited capacity to carry the load of the thread and of the cop. The said load carrying capacity was determined by a lower ball bearing which was not adequate for supporting the load of the rotating cop carrying the thread.

Such a ball bearing is suitable to support radial loads, but is inadequate for separating axial loads.

It has not provide possible to run such ball bearings in an oil-bath, so that it was necessary to have recourse to the lubrication by greases. The centrifugal force discharged by the high speed rotation of the spindle, however, substantially prevented lubricating of such bearings even by grease.

It is also known that a ball or roller bearing consumes a great deal of power, and this is quite disadvantageous in the spinning and twisting field, because of the thousands of spindles that are in operation at all times. A further inconvenience of the grease lubricated spindles is that they tend to overheat. This inconvenience is avoided by the oil lubrication, which allows a quick and continuous heat dispersion, but the problem of keeping the oil in the bearings is still present.

The present invention proposes to arrange the spindle structure in such a manner that the rotatable portion of the structure is completely surrounded by oil at all times.

In general, a small stationary inner pipe is provided through which the thread passes. This pipe passes coaxially through the rotatable portion of the spindle structure from beneath the spindle structure to above the oil level therein. The spindle structure includes a stationary outer casing which is sealed to the small pipe at the bottom of the spindle structure by a seal member, preferably rubberlike, which forms a cavity for containing oil to provide a supply of oil for the spindle structure.

The oil rises between the rotatable portion of the spindle structure and the inner pipe and discharges radially from the rotatable portion via holes provided for this purpose near the upper support bearing for the said rotatable portion. The oil lubricates the said upper support bearing by forming a mist when it leaves the rotatable portion of the spindle structure.

The spindle structure of the above invention comprises: an axially based rotating cylindrical body, a small thread carrying pipe passing through the base in the rotating body and fixed to a base member, said cylindrical body ending at the bottom in a truncated cone surface which rests on a correspondingly shaped seat as the base member, said base member being provided with at least one radial hole leading outwardly from the seat surface of the base member, said rotating body being surrounded by a first inner stationary cylindrical casing, and there being a second outer cylindrical stationary casing with the casing being supported on one another by means of resilient rings, or other corresponding self-centering and dampening elements, in order to form in the spindle unit three coaxial cylindrical airspaces communicating one another at the upper and lower ends thereof, wherein the oil circulates, and with a sealing sleeve connecting the outer casing at the bottom with the small pipe.

The accompanying drawing somewhat diagrammatically illustrates some examples of embodiment of the spindle construction according to the present invention;

FIGURE 1 is a longitudinal section of the lower portion of one form which the spindle structure can take;

FIGURE 2 is a longitudinal section similar to that of FIGURE 1, but of a different embodiment;

FIGURE 3 is a longitudinal section of a third embodiment;

FIGURE 4 is a transverse section indicated by line 4—4 of FIGURE 3; and

FIGURE 5 is a longitudinal section of the lower part of a fourth embodiment of the spindle structure according to the present invention.

The spindle shown in FIGURE 1 comprises an inside tubular and rotating body 10, an outer non-rotating tubular casing 18, and a non-rotating intermediate tubular casing member 22. Body 10 has a truncated-cone surface 11 formed on the bottom. A correspondingly shaped truncated-cone seat is formed on a stationary base member 16, which member fixedly carries a small central pipe 17 for the passage and the protection of the thread. The small central pipe 17 can also be integral with the base member 16. The upper end of body 10 is supported by the radial roller bearing 43 which is fitted into the upper end of casing 18.

The base member 16 is provided with a radial hole 12, extending from a cavity or niche 13 in the outside of base member 16 to an upper portion of the supporting truncated-cone seat on member 16.

The member 16 rests on a disc or small plate 14 made of hardened steel, and provided with holes 15 for the passage of the oil and with a central hole 15' for small pipe 17 fixedly connected with the member 16. The small plate 14 is fixed in the outside 18 by pressing it therein, as by threads, or it may be held in place by a single ring such as the Seeger washer 19. Further, the lower end of casing 18 could be crimped inwardly as at 18' in FIGURE 5 to hold plate 14 in place. In any case, plate 14 is held against rotation in casing 18. The lower portion of the described structure is sealed by a resilient sleeve 20, the upper end of which tightly embraces the lower end of casing 18, while the lower end tightly embraces the pipe 17. Hose clamp 21 may be used to secure the sleeve to pipe 17.

Disposed between the four cylindrical bodies 17, 10, 22 and 18, there are formed three tubular air gaps or airspaces 23, 24, 25 containing the lubricating oil.

Said three airspaces communicate with one another at their lower ends through the holes 12, 13, 15, and in a restricted manner, across the rotating truncated-cone surface 11, while at their upper ends they communicate through the holes 26 and 27 extending radially through the wall of the rotating body 10, through the annular chamber 28 extending across the upper end of member 22, and the vertical holes 29' of the resilient rings 29 which bear radially between members 18 and 22. In the upper end of member 22 there are provided the teeth or pawls 30, adapted for engagement by means stationary with casing 18 in order to prevent rotation of member 22.

During operation, lubricating oil contained in the air spaces 23, 24, 25 in the chamber 31 of the funnel-shaped sleeve 20 completely surrounds the body 10. Oil will flow under the truncated-cone surface 11 into the inside air space 23 upwardly in the said air space until it escapes from the air space via the holes 26, 27. This oil circulation about member 10 brings about a support of the member 10 on the lubricant and this decreases the friction and member 10 is extremely free running. Make-up oil, if needed, is derived from the oil in chamber 31 of sleeve 20, and space 25, via niche 13 and base 12 in member 10. By suitably forming the truncated-cone surface 11 on member 10 and the seat therefor on member 16, it is possible to increase or to diminish the inflow of oil towards the air space 23. Theoretically, by preventing the passage of oil into the chamber 23, it would be possible to eliminate holes 26, 27.

The position of the hole 12 (FIGURE 1) or 39 (FIGURES 2 and 5) is selected so its inner end is near the upper or outer portion of the supporting and rotating truncated-cone surface 11, so that surface 11 always has substantially a full area of contact with member 16, and this controls the amount of oil flowing into space 23 even at a very high rotating speed of the spindle.

FIGURES 2 and 3 show modifications, in which, in the air space 23 between the small pipe 17 and the body 10, there is provided the insertion of a helicoidal spring 40 (FIGURE 3) or of a helicoidal rib 40' (FIGURE 2) having a winding direction opposite to in the rotation, so as to bring about a certain pressure in a direction contrary to the rising of the oil, thus favoring the retaining of lubricant on the rotating seat 11.

According to the embodiment of FIGURE 2, in the air space 25 between the stationary cylindrical casing 22 and the outside casing 18 there is inserted a conventional spring damper 41, for instance, formed by spring steel plate, or rubber wound upon itself with a cylindrical winding. In the middle part of FIGURE 2 between the central small pipe 17 and the spindle 10 there is inserted a sealing means, such as a stuffing box 42 located above the holes 26, 27 and chamber 28.

In FIGURE 3 there are two circular grooves 46, 47 inside the spindle 10, at the height of the holes 26, 27, said grooves serving to guide the oil in the upper end chamber 23 into said holes.

In the embodiment of FIGURE 4, the base member 16 is extended at its lower end by a flat sided boss 16' which is received within the central flat sided opening 15' of the plate 14 to avoid rotation of the base member 16 and cylindrical inside casing 22.

In the upper portion of FIGURE 3 there is shown a variant of the small pipe 17 above the roll bearing 43, in which pipe 17 is provided with an extension pipe 44, having a smaller diameter than pipe 17, for keeping the dust of the thread passing inside at 17. The connection between the pipes 17 and 44 is provided with a tapered zone 43' which favors falling of any oil that might creep up pipe 17 into the surrounding air space.

In FIGURE 5 the truncated-cone support surface 11 on member 10 has a direction contrary to that of FIGURES 2, 3 and 4. The hole 39 carrying the oil to the surface 11 reaches only a portion of the surface, and leaves a part of it untouched in order to assure the tightness of the surface and to hinder the passage of the oil towards the inside, assuring in this way a total lubrication. In the wall of member 10, there is provided a second hole 30, which, starting from the contact surface 11, goes outwardly so that centrifugal force will displace the oil towards the air space 24.

It will be understood that this invention is susceptible to modification in order to adapt it to different usages and conditions and, accordingly, it is desired to comprehend such modifications within this invention as may fall within the scope of the appended claims.

What is claimed is:
1. A spinning and twisting damping spindle, comprising; an axially bored cylindrical rotating body, a small pipe extending axially through the bore in the rotating body, a base member at the bottom end of the rotating body sealingly fixedly engaging said small pipe, said rotating body having at its lower end a truncated-cone surface and a correspondingly shaped seat on said base member, said base member having at least one hole therein having one end terminating at said surface on the said rotating body, a first inner stationary cylindrical casing surrounding said rotating body and supported by said base member, a second outer stationary cylindrical casing surrounding said first casing, centering elements disposed between said inner and outer casings, said small pipe and said rotating body and said inner and outer casings forming three coaxial cylindrical interspaces therebetween, first means providing communication between said spaces at the upper end thereof, and second means providing communication between at least the outermost one of said spaces at the bottom thereof, and the other end of said hole in said base member.

2. A spindle according to claim 1, which includes a plate in the lower end of said outer casing on which said base member rests, axial holes in said plate, and a seal member sealed to said outer casing and to said small pipe beneath said plate, said seal member having a cavity therein for containing oil and communicating with said axial hole in the plate, said axial holes also communicating with at least the outermost one of said spaces.

3. A spindle according to claim 2, which has a transverse slot, and said base member has a boss therein extending into said slot to hold the base member against rotation, said base member in turn holding said inner casing against rotation.

4. A spindle according to claim 1, in which said first means includes radial holes in said rotating body, near the upper end of said spaces, and a space in the upper end of said outer casing connecting the space between said rotating member and said inner casing with the outermost one of said spaces, said centering elements having axial passages therein.

5. A spindle according to claim 1, in which said hole extends substantially axially downwardly from said surface in said base member and said rotating body has a passage therein leading from said surface upwardly and outwardly in said rotating body to the said space between said rotating body and said inner casing.

6. A spindle according to claim 1, which includes helical means in the space between said rotating body and said small inner pipe having a winding direction opposite to the direction of rotation of said rotating body.

7. A spindle according to claim 1, which includes an upper bearing for said rotating body, said small pipe terminating at its upper end near the upper end of said upper bearing, a smaller pipe extending upwardly from the upper end of said small pipe, and a tapered transition zone connecting the outer surface of said small pipe with the outer surface of said smaller pipe to inhibit flow of oil upwardly past said zone.

References Cited by the Examiner
UNITED STATES PATENTS
790,526  5/1905  Salathe et al. _____ 308—149

FRANK J. COHEN, *Primary Examiner.*
STANLEY N. GILREATH, J. PETRAKES,
*Assistant Examiners.*